C W. HELM.
BAKING OVEN.
APPLICATION FILED JUNE 22, 1916.
1,274,880.
Patented Aug. 6, 1918.
2 SHEETS—SHEET 1.
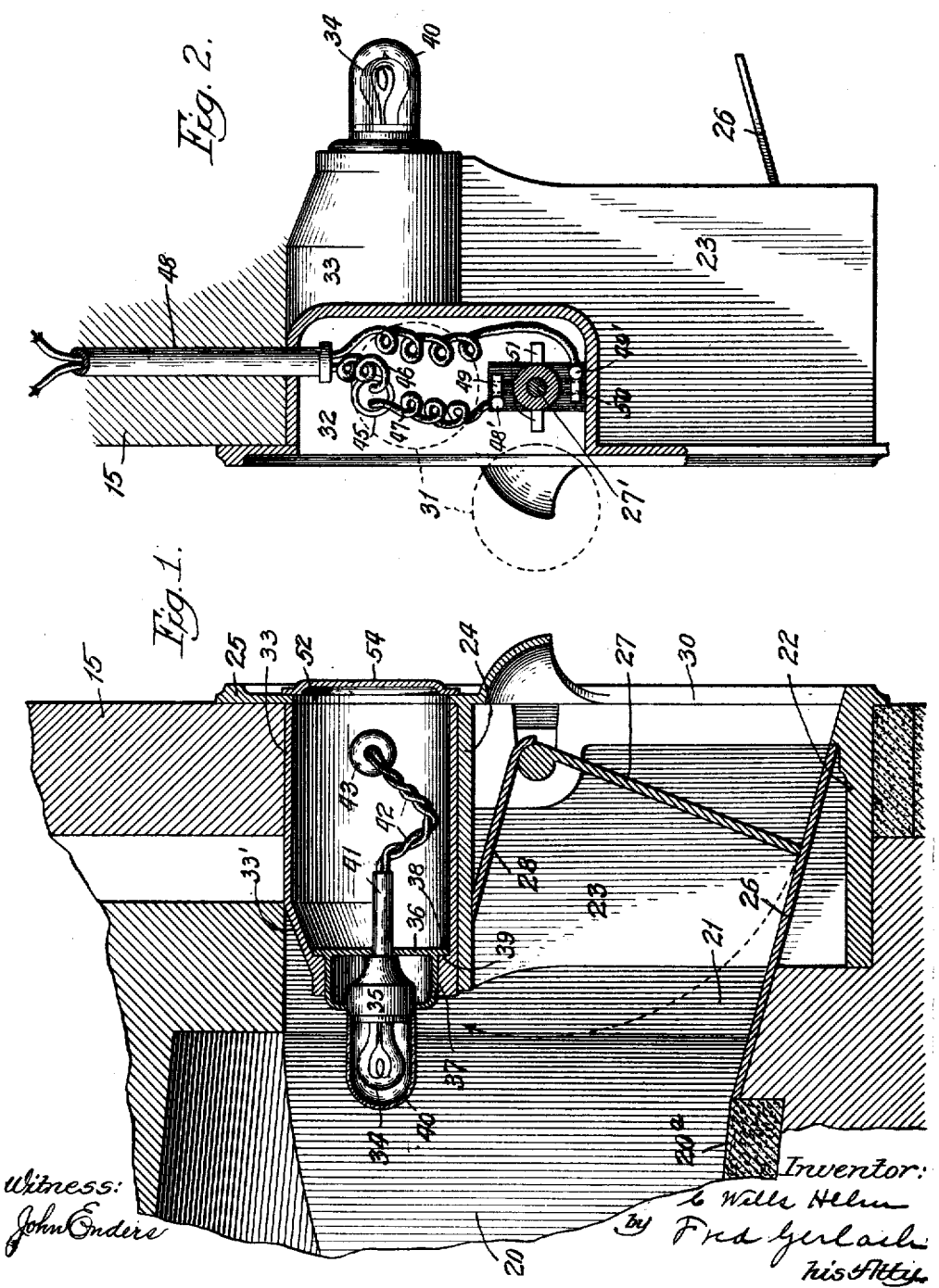

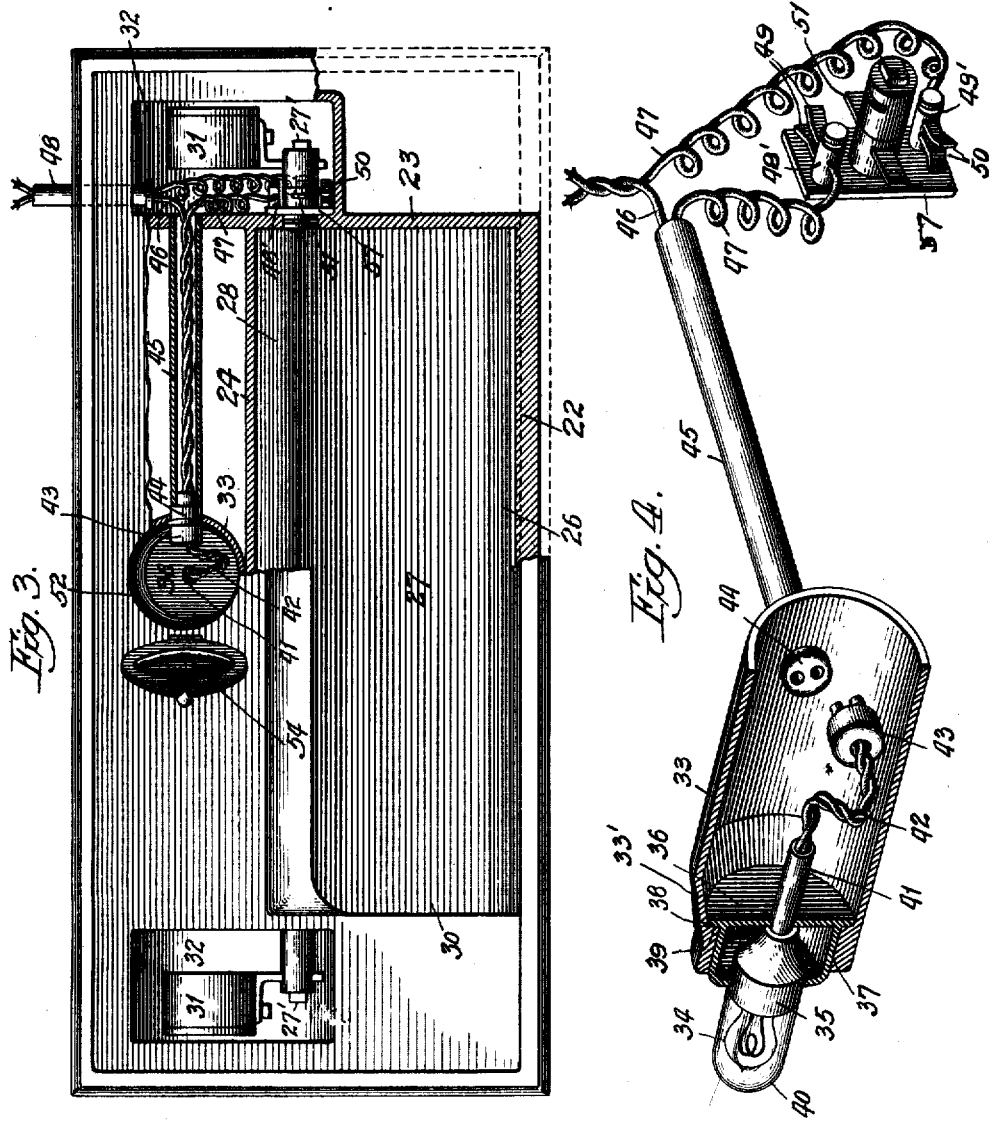

UNITED STATES PATENT OFFICE.

C WELLS HELM, OF CHICAGO, ILLINOIS.

BAKING-OVEN.

1,274,880.  Specification of Letters Patent.  Patented Aug. 6, 1918.

Application filed June 22, 1916. Serial No. 105,125.

*To all whom it may concern:*

Be it known that I, C WELLS HELM, a citizen of the United States, and a resident of Chicago, in the county of Cook and State of Illinois, have invented certain new and useful Improvements in Baking-Ovens, of which the following is a full, clear, and exact description.

The invention relates to baking ovens and more particularly to the apparatus provided for illuminating the baking chamber for inspection of the product.

One object of the invention is to provide improved lighting apparatus comprising an electric lamp which is removably disposed in the baking chamber itself and above the charging door and at a point where the product in the baking chamber will be illuminated without misleading shadows. A further object is to provide improved electric lighting apparatus for the baking chamber which can be readily and conveniently removed for the purpose of cleaning the protective lamp container in the baking chamber. A further object of the invention is to provide improved lighting apparatus which, when installed in the oven, will prevent the escape of steam and heat from the baking chamber. Lastly, the invention designs to provide an improved lighting apparatus for the baking chamber of an oven.

In the drawings: Figure 1 is a vertical longitudinal section through the door of the baking chamber and the lighting apparatus. Fig. 2 is a vertical section through one of the chambers at the sides of the charging door, showing the switch operated by the charging door. Fig. 3 is a front elevation of the door, parts being shown in section. Fig. 4 is a sectional perspective of the lighting apparatus and its connections, separated from the oven, the switch-plug, which is removable from the oven with the lamp, being shown withdrawn from the switch-socket.

The invention is shown as applied to a baking oven comprising a structure of masonry 15 in the body of which a baking chamber 20 is formed. Since the invention relates to the lighting apparatus for the baking chamber, it has not been deemed necessary to illustrate and describe a complete oven, an exemplification of which may be found in Letters Patent No. 1,165,409 granted to me December 28, 1915.

An opening 21 is formed in the front structure 15 and extends from the baking chamber through the front of the structure. A door-frame comprising a bottom wall 22, side walls 23, and a top wall 24 is built into the opening 21. This frame is provided with a front wall or flange 25 fitting against the front face of the structure 15. An inclined plate 26 extends from the lower front portion of said frame to the bottom 20ª of the baking chamber. A door 27 is provided with pintles 27' at its ends which are held so as to permit the door to be swung backwardly and upwardly for charging and inspection of the contents of the baking chamber. A plate 28 fits against the curved upper edge of the door and extends to the top wall 24 to form a closure between the door and the top wall of the frame. An opening 30 is formed in the front wall 25 of the door-frame to provide access to the door 27. A counterweight 31 is secured to each pintle 27' in such manner as to cause the door to be held open by the weights after it has been shifted to its open position and so that they will not tend to shift the door when it is in closed position, shown in Fig. 1. Each of these weights is disposed in chambers 32 formed in the door frame, the walls of the latter being extended to form these chambers adjacent the outer sides of the side walls 23 of the door frame. The fronts of these chambers 32 are open to render the weights accessible for the purpose of shifting the door.

A housing 33 is built into and extends through the front of structure 15, the masonry of the structure being laid around the housing. This housing is for the insertion and removal of an electric lamp 34 which is mounted in a suitable socket 35. A lamp-supporting head 36 secured to said socket fits snugly in an opening 37 in the inner end of the housing 33. This head is provided with a flange 38 fitting against a shoulder 39 in the housing. A glass lamp protector 40 contains the electric lamp 34 and is suitably secured to the socket 35. A pipe 41 is secured to the socket 35. This pipe 41 serves as a handle for removing and replacing the lamp with its protector 40, socket 35, and head 36 and also serves as a holder for the flexible electric conductors 42 which are suitably connected to the usual terminals in lamp socket 35 and to conductor-terminals in a switch-plug 43. The latter is adapted for connection to a suitable switch-socket 44 which is mounted in one side of the housing 33. Adjacent its inner end, the housing 33 is tapered, as at 33′, for the purpose of guiding the head 36 into the opening 37 in the housing. A pipe 45 extends from the switch-socket 44 through the masonry of structure 15 to one of the side walls 23 of the door frame and the electrical conductors 46 and 47 leading to the switch-socket 44 are extended through this pipe. These leading-in conductors are also extended through a vertical pipe 48 in the oven structure 15. A door-controlled switch is included in conductor 47 to cause the circuit through the lamp to be automatically closed when the door is open and to interrupt the circuit when the door is closed. For this purpose, one branch of the conductor 47 is connected to a post 48′ provided with spring-contact members 49 and the other branch is connected to a post 49′ provided with spring-contact members 50. A movable switch member 51 is secured to rotate with one of the pintles 27′ of the door and is arranged so that when the door is open, it will electrically connect contacts 49 and 50 and when the door is closed, it will be out of contact with either of said contacts, as shown in Fig. 4. Posts 48′ and 49′ are mounted on a plate 57 of insulating material. The front 25 of the door frame has an opening 52 in registry with the housing 33 and a door 54 is adapted to close opening 52, being hinged to the front wall 25 at one side of said opening.

It will be observed that the electric lamp 34 is disposed above the door opening and within the baking chamber, that is, rearwardly of the front wall of the baking chamber immediately above the door frame. In practice, it has been found that in lighting apparatus heretofore employed, the lamp was placed in the front wall where shadows would fall upon the contents of the baking oven and these, at times, would mislead the baker into withdrawing the product before or after the correct time for removal. The present invention overcomes this objection to prior ovens, because the lamp is disposed within the baking chamber and above the door where it will shed light evenly upon the contents of the baking chamber without casting misleading shadows upon the product, and furthermore, by disposing the lamp above the door, in lieu of at one side thereof, a door of the maximum width can be used which is desirable in a baking oven.

In practice, the lamp bulbs or the transparent protectors usually used, frequently become coated with steam and in order to effectively illuminate the baking-chamber, the bulb or protector must be wiped off and cleaned. By withdrawing the switch 43 from the socket 44 and grasping handle-pipe 41, the baker can quickly withdraw the lamp and its support from the baking chamber for cleaning and can quickly restore the lamp to its operative position in the baking chamber, the tapered portion 33′ of the housing 33 facilitating the passage of the head or support 36 for the lamp socket 35 into the opening 37 at the inner end of the housing, so that a joint will be formed between the housing and the support 36 which will prevent material escape of heat from the baking chamber.

By providing a door-controlled switch, the lamp will be rendered operative whenever the oven door is open. If it should be desired to keep the door open when the oven is not in operation, the circuit can be interrupted by withdrawing switch-plug 43 from socket 44.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a baking oven, the combination of a structure having a baking chamber therein, a door in the structure at the front of the baking chamber, a housing extending through the front of said structure and having an opening at its rear end, lamp-supporting means removably held in said opening, a switch comprising separable members one of which is removable from the housing with the lamp and its support and the other of which is fixed in the housing, and electrical conductors for the lamp connected to the removable switch member.

2. In a baking oven, the combination of a structure having a baking chamber therein, a door in the structure at the front of the baking chamber, a housing extending through the front of said structure and having an opening at its rear end, lamp-supporting means removably held in said opening, a switch comprising separable members, one of which is removable from the housing with the lamp and its support, a pipe on said support and in the housing, and electrical conductors for the lamp extending through said pipe and connected to said removable switch-member.

3. In a baking oven, the combination of a structure having a baking chamber therein, a door in the structure at the front of the baking chamber, a housing in the front wall of the structure and above the door, an electric lamp, a lamp-support removably held in the housing, and a door-operated switch for controlling the lamp circuit disposed at one end of the door, and a switch comprising separable members disposed in the housing.

C. WELLS HELM.

Copies of this patent may be obtained for five cents each, by addressing the "Commissioner of Patents, Washington, D. C."